(12) United States Patent
Baranski

(10) Patent No.: US 8,378,907 B2
(45) Date of Patent: Feb. 19, 2013

(54) RETAINING SOCKET FOR VEHICLE GLAZING

(75) Inventor: Detlef Baranski, Recklinghausen (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 301 days.

(21) Appl. No.: 12/990,109

(22) PCT Filed: Apr. 29, 2009

(86) PCT No.: PCT/EP2009/055238
§ 371 (c)(1),
(2), (4) Date: Oct. 28, 2010

(87) PCT Pub. No.: WO2009/133162
PCT Pub. Date: Nov. 5, 2009

(65) Prior Publication Data
US 2011/0074643 A1 Mar. 31, 2011

(30) Foreign Application Priority Data
May 2, 2008 (GB) .................................. 0808056.6

(51) Int. Cl.
*H01Q 1/32* (2006.01)
(52) U.S. Cl. ...................................................... 343/713
(58) Field of Classification Search .................. 343/711, 343/712, 713
See application file for complete search history.

(56) References Cited

U.S. PATENT DOCUMENTS

| | | | |
|---|---|---|---|
| 5,355,144 A | 10/1994 | Walton et al. | |
| 6,020,855 A * | 2/2000 | Nagy et al. | 343/713 |
| 6,424,306 B1 | 7/2002 | Militz et al. | |
| 7,592,960 B2 * | 9/2009 | Byrne et al. | 343/713 |
| 2001/0013841 A1 | 8/2001 | Dishart et al. | |
| 2005/0195115 A1 | 9/2005 | Yegin et al. | |
| 2006/0273966 A1 | 12/2006 | Maeuser | |
| 2008/0062053 A1 * | 3/2008 | Marko et al. | 343/713 |
| 2010/0060077 A1 | 3/2010 | Paulus et al. | |

FOREIGN PATENT DOCUMENTS

| | | |
|---|---|---|
| DE | 102 11 444 A1 | 10/2003 |
| DE | 10 2005 042 960 A1 | 3/2007 |
| EP | 0 561 272 A1 | 9/1993 |
| GB | 1 427 368 A | 3/1976 |
| WO | WO 98/16905 A1 | 4/1998 |
| WO | WO 01/73890 A1 | 10/2001 |
| WO | WO 2005/091827 A2 | 10/2005 |
| WO | WO 2008/058881 A1 | 5/2008 |

OTHER PUBLICATIONS

Search Report dated Aug. 28, 2008, issued by the United Kingdom Patent Office in corresponding UK Patent Application No. GB0808056.6.
International Search Report (PCT/ISA/210) issued on Aug. 18, 2009, by European Patent Office as the International Searching Authority for International Application No. PCT/EP2009/055238.

* cited by examiner

*Primary Examiner* — Hoang V Nguyen
(74) *Attorney, Agent, or Firm* — Buchanan Ingersoll & Rooney, P.C.

(57) ABSTRACT

A retaining socket for mounting a vehicle glazing accessory is disclosed. The retaining socket comprises a base portion for mounting on the surface of a glazing; a retaining portion for retaining a vehicle glazing accessory; and a retaining portion for retaining a communication device. The base portion comprises an electrically conductive coupling portion, connected to the communication device. A glazing having such a socket mounted thereon is also disclosed.

17 Claims, 3 Drawing Sheets

RETAINING SOCKET FOR VEHICLE GLAZING

The present invention relates to a vehicle glazing accessory retaining socket and a glazing having such a retaining socket mounted thereon.

As an alternative to conventional rod antennas, vehicle glazings may be provided with an antenna either printed onto a surface of a single ply glazing or embedded within a laminated glazing. Such antennas may be used to receive or to transmit a signal, and in both cases may require electrical connection with an antenna amplifier and/or a radio via a radio connector cable. The amplifier may be mounted on the vehicle body or on the glazing, and connected to the antenna by means of a wired galvanic connection. Such devices are usually affixed at the outer edge of the glazing, in the vicinity of the vehicle window frame. Consequently, if the glazing is removed from the vehicle, for whatever reason, such as breakage, this connection needs to be remade.

One issue arising from using a galvanic connection with a laminated glazing, such as a windscreen, is the risk of moisture ingress at the point the wiring enters the laminated structure to contact the antenna wire/print. This may cause localised delamination, and cause changes in the stresses within the edge region of the glazing, leading to cracking.

Therefore it would be advantageous to be able to mount devices required for the operation of an antenna in a manner that overcomes these difficulties.

vehicle glazing accessory may be dimensioned to fit within a vehicle glazing accessory.

The present invention provides a vehicle glazing comprising at least a first ply of a transparent glazing material and a ply of a plastics material extending across at least a portion of a surface of the ply of transparent glazing material, a first electrical conductor provided in contact with the ply of plastics material for supplying an electrical signal to a communication device positioned on the glazing, and a retaining socket, for retaining the communication device and at least one vehicle glazing accessory, mounted on the glazing and having a first electrically conductive coupling portion, wherein the first electrically conductive coupling portion of the retaining socket is aligned with and in direct current electrical isolation from the electrical conductor provided in contact with the ply of plastics material.

By providing the ability to form a capacitive electrical connection, not only is the flexibility of positioning of a communication device such as an antenna amplifier and other vehicle glazing accessories increased, the disadvantages of using galvanic electrical connections to such communication devices are also overcome.

The electrical conductor provided in contact with the ply of plastics material may be a printed region of electrically conductive ink. Alternatively, the electrical conductor provided in contact with the ply of plastics material may be an electrically conductive wire embedded in a surface of the ply of plastics material.

The ply of plastics material may be an impact resistant polymer film.

Preferably, the ply of plastics material is a ply of interlayer material, and the glazing further comprises a second ply of a transparent glazing material, the first and second plies of transparent glazing material and the ply of plastics material being laminated together.

Preferably, the electrical conductor provided in contact with the ply of plastics material and the electrical conductive portion of the retaining socket form a capacitive connection.

The electrically conductive coupling portion of the retaining socket may be a metallic plate.

The electrical conductor provided in contact with the ply of plastics material is preferably an antenna for receiving or transmitting AC signals in the range 100 kHz to 100 GHz.

Preferably, the electrical conductor provided in contact with the ply of plastics material has a length of approximately $\lambda_g/4$, where $\lambda_g$ is the wavelength in the glazing of a signal received or transmitted by the antenna.

The electrically conductive coupling portion of the retaining socket may be in the form of a plate extending across at least a portion of the width of the retaining socket.

The electrically conductive coupling portion of the retaining socket may be in the form of a wire embedded within the retaining socket.

The electrically conductive coupling portion of the retaining socket and the electrical conductor provided in contact with the ply of plastics material may overlap.

The electrically conductive coupling portion of the retaining socket and the electrical conductor provided in contact with the ply of plastics material may be in registration.

The communication device may be one of an antenna amplifier; an antenna terminal connection; an antenna stud; a radio connector cable, a transmitter or a receiver. Preferably the vehicle accessory is one of a rear view mirror; a camera; a compass; a sensor; a display device; an automated toll collection transponder; a further antenna; GPS (global positioning system) or traffic monitoring system. The rear view mirror may be an electrochromic rear view mirror.

The glazing may comprise a second electrical conductor in contact with the ply of plastics material, and the retaining device comprises a second electrically conductive coupling portion, aligned with a second electrical conductor and in direct current electrical isolation therefrom. Preferably the second electrical conductor forms an inductive electrical supply connection for supplying electrical power to the retaining socket.

A vehicle glazing having a retaining socket mounted thereon is also provided.

The present invention will now be described by way of example only, and with reference to the accompanying drawings in which.

The present invention has adopted the approach that a communication device such as an antenna amplifier or other device/module required for antenna function may be mounted in a retaining socket used to mount at least one vehicle glazing accessory positioned in any suitable region of the vehicle glazing. For example, the communication device is preferably positioned within a retaining socket, such as a mirror boss that is provided with a metallic portion used to form a non-galvanic electrical connection, such as a capacitive connection, with an antenna formed either within, or on the surface of, the vehicle glazing. The examples below given in terms of antenna receivers but this should not be seen as limiting, as the invention is equally applicable to both antenna transmitters and receivers.

Figure 1:
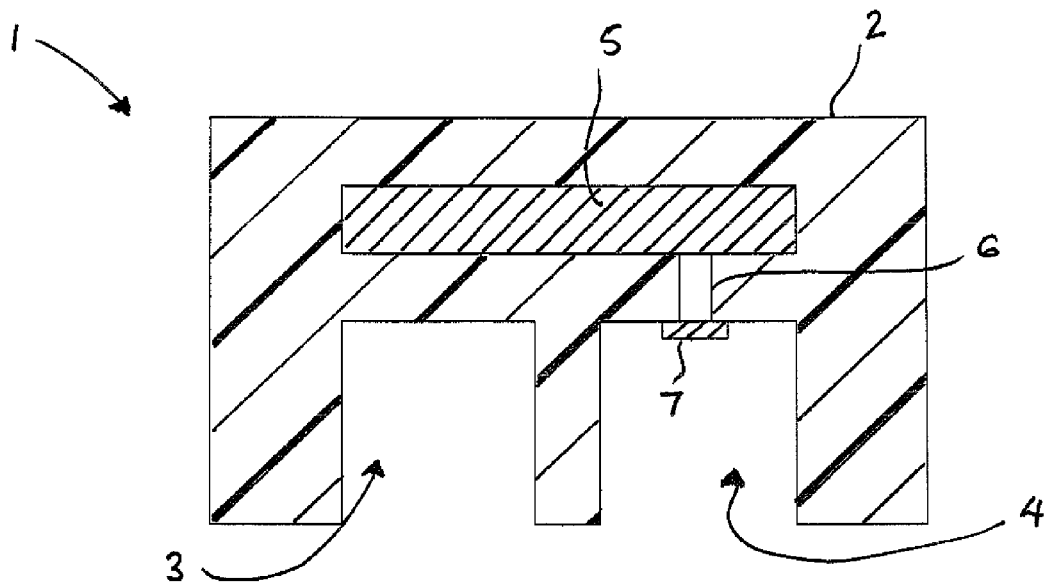
FIG. 1 is a schematic cross section showing a first embodiment of a retaining socket in accordance with the present invention.
Figure 2:
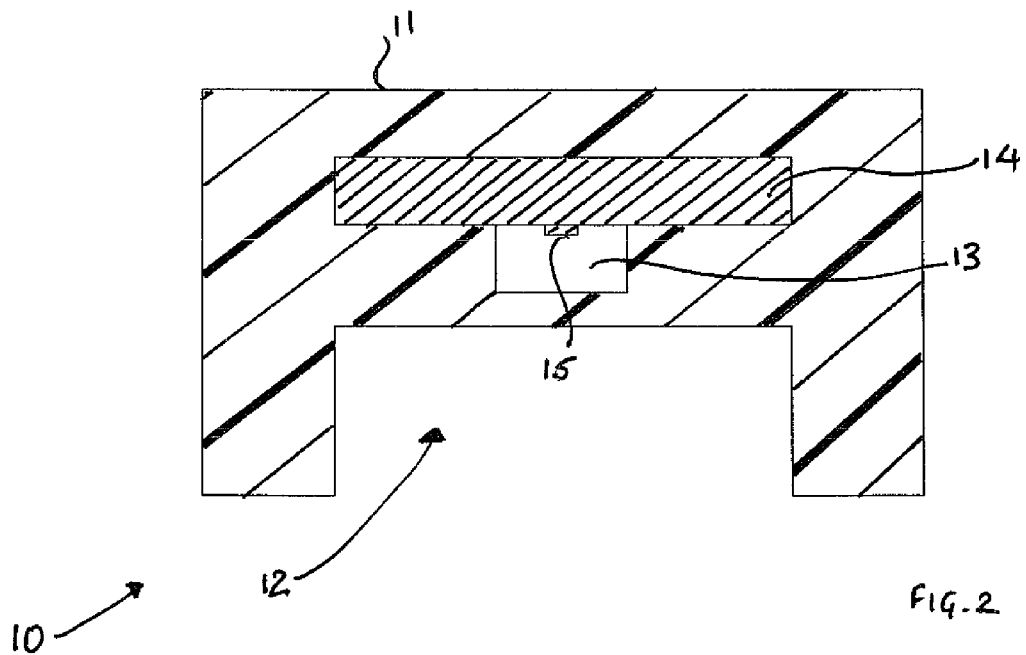
FIG. 2 is a schematic cross section showing a second embodiment of a retaining socket in accordance with the present invention.

The retaining socket is shown in more detail in FIGS. 1 and 2. FIG. 1 is a schematic cross section showing a first embodiment of a retaining socket in accordance with the present invention. The retaining socket 1 comprises a base portion 2, for contact with and bonding to a surface of a vehicle glazing (not shown), enabling the retaining socket 1 to be mounted on a vehicle glazing and used subsequently in a vehicle. A first retaining portion 3 is provided to retain a vehicle glazing accessory, such as a rear view mirror (not shown), and a second retaining portion 4 is provided to retain a communication device (again, not shown) such as an antenna amplifier. The retaining socket 1 is provided with an electrically conductive coupling portion 5, which is provided with an electrical connection 6 to a terminal 7 to which the communication device is attached when mounted in the retaining socket.

FIG. 2 is a schematic cross section showing a second embodiment of a retaining socket in accordance with the present invention. The retaining socket 10 comprises a base portion 11 for contact with and bonding to a surface of a vehicle glazing (not shown). This enables the retaining socket 10 to be mounted on a vehicle glazing and subsequently used in a vehicle. A first retaining portion 12 is provided to retain a vehicle glazing accessory, such as a rear view mirror (not shown). A second retaining portion 13 is provided internally within the main body of the retaining socket 10 to retain a communication device (again, not shown) such as an antenna amplifier. In this embodiment therefore, the communication device is effectively embedded within the retaining socket 10. The retaining socket 10 is provided with an electrically conductive coupling portion 14, which in use is in electrical connection with the communication device, either via a terminal 15 positioned in the second retaining portion 13 or directly with the communication device.

The use of retaining sockets in accordance with the present invention with vehicle glazings will now be described.

Figure 3:
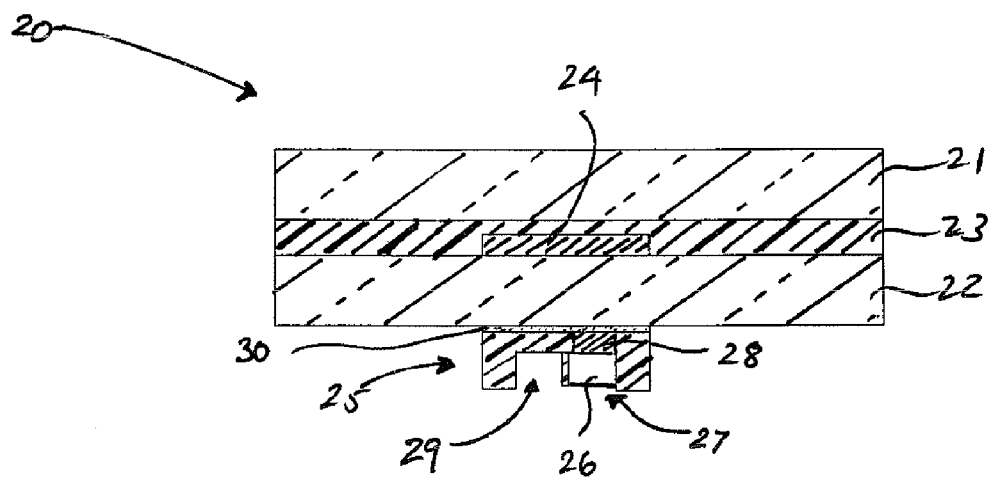
FIG. 3 is a schematic cross-section of a vehicle glazing having a retaining socket and communication device in accordance with the present invention mounted thereon.

FIG. 3 is a schematic cross-section of a vehicle glazing having a retaining socket in accordance with the first embodiment of the present invention mounted thereon. The vehicle glazing 20 comprises a first 21 and second 22 ply of a transparent glazing material having a ply of a plastics material 23 laminated therebetween. An electrical conductor for supplying an electrical signal to a communication device positioned on the glazing is provided in the form of an antenna connector region 24 formed as part of an antenna (not shown) and in contact with the ply of plastics material 23. A retaining socket 25, such as a mirror boss, is mounted on the vehicle glazing 20, on the surface which will form the interior surface of the vehicle glazing when fitted into a vehicle. A communication device 26, such as an antenna amplifier, is provided within a retaining portion 27 of the retaining socket 25 and in electrical connection with an electrically conductive coupling portion 28 provided as part of the retaining socket 25. The electrically conductive coupling portion 28 is aligned with the antenna connector region 24, forming a capacitive connection with the antenna connector region 24 and therefore providing electrical signals to the communication device 26. To enable this, the electrically conductive coupling portion 28 is in direct current (DC) electrical isolation from the antenna connector area 24, as it is separated from the antenna connector area 24 by a ply of transparent glazing material. It is therefore possible for AC (alternating current) to pass between the electrically conductive coupling portion 28 and the antenna connector area 24. A second retaining portion 29 is provided to retain a vehicle glazing accessory (not shown) in the retaining socket 25. The antenna (not shown) and antenna connection region 24 are provided by an electrically conductive wire embedded within the ply of plastics material 23. The retaining socket 25 is mounted on the glazing by means of a layer of adhesive 30, extending across at least a portion of the base portion of the retaining socket 25.

Figure 4:
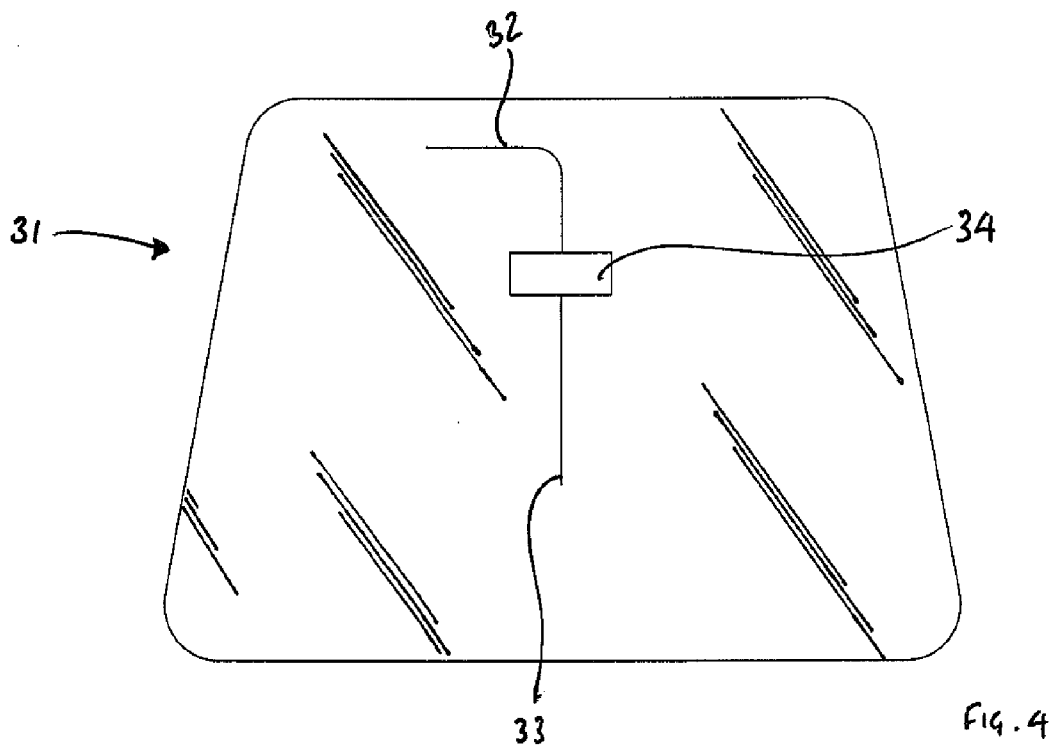
FIG. 4 is a schematic plan view showing the relative positions of two possible antenna areas and a mirror boss.

FIG. 4 is a schematic plan view showing the relative positions of two possible antenna areas and a mirror boss on a vehicle glazing. The vehicle glazing 31 has a first antenna region 32 that is generally "L"-shaped, with the longest portion of the "L" running parallel with the upper edge of the vehicle glazing 31. Alternatively or additionally, a second antenna region 33 may be provided, which runs vertically down the centre of the vehicle glazing 31. Where the vehicle glazing 31 is a windscreen, the wiring used may have a maximum diameter of 150 μm if positioned in the visible area (A Zone). The antenna itself need not be a stretch of straight wire as illustrated, but may have undulations, reticulations or a saw-tooth shape, depending on design, available space and/or operating frequency. The mirror boss 34 is positioned in the upper region of the vehicle glazing 31, above an antenna connector point provided on either the first 31 or second 32 antenna region.

Figure 5:
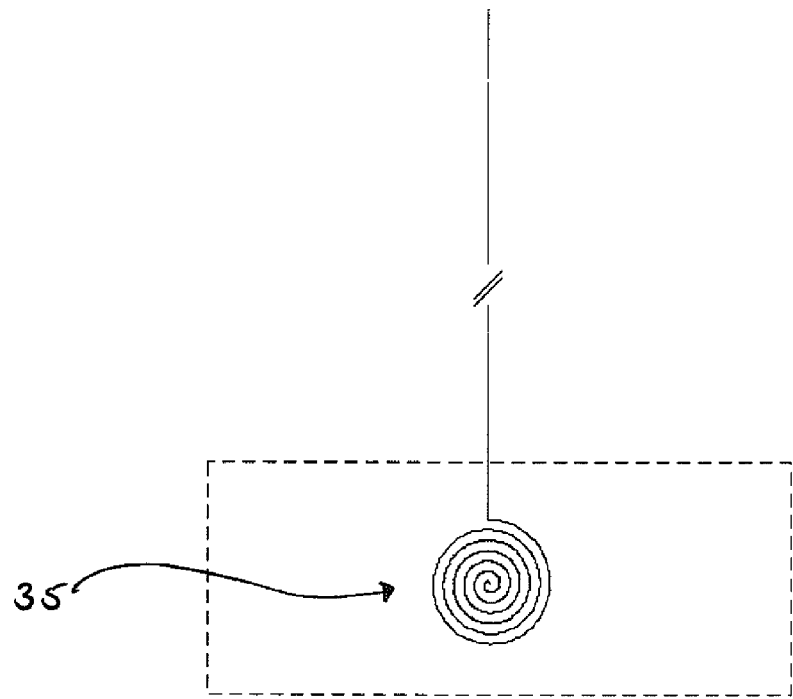
FIG. 5 is a schematic plan view showing an enlarged antenna connector area aligned with the position of a mirror boss.

FIG. 5 is a schematic plan view showing an enlarged antenna connector area aligned with the position of a mirror boss. The antenna connector area 35 is formed from the antenna wire, and is arranged as a spiral or helix. The electrically conductive wire forming the antenna connector area 35 has an effective length of approximately $\lambda_g/4$, where $\lambda_g$ is the wavelength in the vehicle glazing of a radio or other signal received or transmitted by the antenna portion 36 of the antenna wire (shown as a broken line to indicate the relative length of the antenna portion 36 to the antenna connector area 35). This allows the antenna connector area 35 to act, in co-operation with the corresponding electrically conductive coupling portion in the retaining socket (not shown) as a band-pass filter for a chosen bandwidth.

Figure 6:
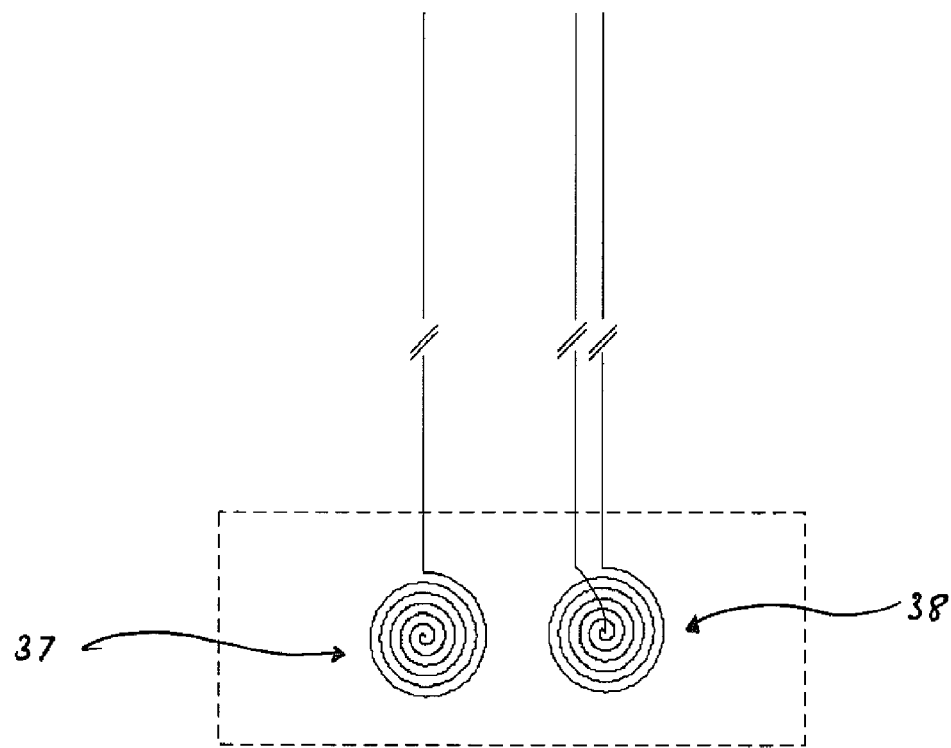
FIG. 6 is a schematic plan view showing an antenna having an antenna connector area, and an electrical supply connector area, both aligned with the position of a mirror boss.

FIG. 6 is a schematic plan view showing an antenna having an antenna connector area, and an electrical supply connector area, both aligned with the position of a mirror boss. In FIGS. 1 to 3, the retaining socket is designed to hold a vehicle glazing accessory that does not require an external power supply to function, such as a standard (non-electrochromic) rear-view mirror. However, it is increasingly common to use vehicle glazing accessories that require an electrical power source. For example, rear-view mirrors may in fact be auto-dimming electrochromic rear-view mirrors. Alternatively, other vehicle glazing accessories such as sensors (rain, moisture or light sensors) and cameras which may be mounted on a vehicle glazing via a retaining socket also require an electrical supply to function.

In FIG. 6, an antenna connector area 37 is supplemented by an electrical supply connector area 38 which may be used to form an inductive electrical connection to enable electrical power to be supplied to a vehicle glazing accessory positioned within a retaining socket aligned with the antenna connector area 37 and the electrical supply connector area 38. In this example, the electrical supply connector area 38 is formed by an electrically conductive wire embedded within the ply of plastics material forming a laminated vehicle glazing, in the same manner as the antenna connector area 24 shown in FIG. 3. The retaining socket comprises a second electrically conductive coupling portion (not shown) to enable the inductive electrical connection to be formed. The electrical supply connector area 38 may be formed into a shape determined by the current carrying capacity of the electrically conductive wire used, the area available for the connector region and the power draw required by the vehicle glazing accessory. In this example, a helical or spiral connector area 38 is shown. Both the antenna connector area 37 and the electrical supply connector area 38 are in direct current electrical isolation from the electrically conductive coupling portions in the retaining socket, again as they are separated by a ply of the transparent glazing material.

In the above examples, the vehicle glazing is a laminated glazing, preferably a windscreen. The transparent glazing material used may be silicate float glass, which may be annealed, toughened or semi-toughened, tinted, or clear, and having a thickness in the region of 1.4 to 3.0 mm. The ply of plastics material used to laminate the plies of transparent glazing material together is preferably an interlayer material, such as polyvinyl butyral, ethylene vinyl acetate, or an ionomer material, and may be co-extensive with the plies of transparent glazing material or may extend across only a portion of one of the plies of transparent glazing material.

Whilst the retaining socket is preferably a mirror boss, other types of retaining socket may be used. The term "retaining socket" is intended to cover any type of socket that retains a vehicle glazing accessory and is mounted on a glazing, for example by having the accessory inserted within a cavity or having the accessory clipped on or over the retaining socket. The electrically conductive coupling portions of the retaining socket may be formed from a metallic plate, which may extend across the entire base area of the retaining socket in contact with the vehicle glazing or only a part of it. Alternatively, the electrically conductive coupling portions may be formed from electrically conductive wires embedded within the retaining socket. The areas and designs of the electrically conductive coupling portion are determined by the wavelength in the glazing of the radio or other signal received by the antenna wire, and the transferred electrical power required for the vehicle glazing accessory retained by the retaining socket, respectively. For example, if the electrically conductive coupling portion is formed from an electrically conductive wire embedded within the retaining socket, the wire may also have an effective length corresponding to $\lambda_g/4$, where $\lambda_g$ is the wavelength in the vehicle glazing of a radio or other signal received or transmitted by the antenna portion of the antenna wire, to which a non-galvanic, such as a capacitive, electrical connection will be made when the antenna is in use. To enhance the inductive coupling between the electrical supply connector area for the vehicle glazing accessory and the electrically conductive coupling portion of the retaining socket, it may be desirable to include a soft magnetic material, such as a ferrite, for example, in the form of an inductive core. Alternatively, transmission line coupling may be utilised for both the antenna connector area and the electrical supply connector area. Multiple connector areas for different types of coupling, where at least one area is an antenna connector area, may be provided. Although in the above example the antenna connector area and the electrical supply coupling area are shown as being adjacent to one another, they may be arranged to suit the available space, for example, one within the other.

The retaining socket itself is preferably formed from a plastics material, such as polypropylene or ABS, and may be bonded to the surface of the glazing using an adhesive. Such retaining socket materials and adhesives are well known within the field of vehicle glazings. Alternatively, the retaining socket may be made entirely of a metallic material (such as stainless steel or aluminium) or other electrically conductive material.

Preferably, the antenna and antenna connector area are formed from an electrically conductive wire embedded within the ply of plastics material. Suitable wires may be copper, tungsten, steel or alloys thereof, and may additionally have an insulating coating. The wire may preferably have a diameter in the range of 50 µm to 150 µm. Typically wires embedded within such plastics materials are embedded close to one surface thereof Alternatively, the antenna and antenna connector area may be formed from a printed region of electrically conductive ink. Where an inductive electrical connection is also to be included within the retaining socket, the electrical supply connector area and wire supplying the electrical supply connector area are also preferably formed from an electrically conductive wire, such as those listed above. Alternatively, the electrically connector area and its supply wire may be formed from a printed region of an electrically conductive ink. As a further alternative, the antenna, antenna connector area, and/or the electrical supply connector area may be formed from an electrically conductive coating, provided either on a surface of the glazing, or on the surface of a ply of plastics material forming part of the glazing.

Ideally, to form a capacitive, an inductive or a transmission line electrical connection, the antenna or electrical supply connector areas and the corresponding electrically conductive coupling portions of the retaining socket are provided in registration (directly aligned one above the other). Alternatively, it may only be necessary for the antenna or electrical supply connector areas and the electrically conductive coupling portions of the retaining socket to overlap.

Whilst the invention has been described above in terms of a laminated vehicle glazing, it is also suitable for use with other vehicle glazings, in particular those known as bi-layer glazings, comprising a ply of transparent glazing material, such as annealed, toughened or semi-toughened silicate float glass, and a ply of plastics material, such as an impact-resistant polymer film, applied to one surface of the ply of transparent glazing material. Again, the antenna and antenna connector area, and electrical supply connector area if applicable, may be provided by embedding a wire within the ply of plastics material, or by printing a region of an electrically conductive ink on the surface of the ply of transparent glazing material covered by the ply of plastics material. As the ply of plastics material faces into a vehicle when fitted, the retaining socket is mounted on this ply of plastics material, and the antenna connector area, and electrical supply connector area if applicable, is in direct current electrical isolation from the corresponding electrically conductive coupling portion of the retaining socket. As a further alternative, the vehicle glazing may by a single ply of toughened silicate float glass, and the ply of plastics material may extend across only a portion of a surface of this glazing, as it acts to form the adhesive bonding the retaining socket to a surface of the glass.

The term "communication device" includes any type of electronic device that functions to enable communication into, out of or within a vehicle in which the device is fitted. Preferably, the device is one of an antenna amplifier; an antenna terminal connection; an antenna stud; a radio connector cable (such as a co-axial cable, where the antenna is connected directly without use of an amplifier); a transmitter or a receiver. Such communication devices are suitable for use with AM, FM, TV, mobile phone, satellite navigation equipment and DAB frequencies.

The term "vehicle glazing accessory" includes the following: a rear view mirror; an auto-dimming electrochromic rear-view mirror; a camera (such as a lane departure camera; an auto headlamp dipping camera; an IR distance system camera; an adaptive cruise control camera; an auto headlamp camera); a compass; a sensor (such as a rain sensor; a moisture sensor; a light sensor; a garage door sensor); a display device (a monitor or screen) and an automated toll collection transponder. In a further embodiment, the vehicle glazing accessory may comprise a further antenna, operating at a different frequency range to the antenna within the glazing. For example, the antenna within the glazing may operate in a frequency range $f_1$, where $f_1$ is equal to 100 MHz to 400 MHz, and the antenna within the retaining socket may operate within a frequency range $f_2$, where $f_2$ is equal to 400 MHz to 800 MHz. Other communication devices, such as GPS (global positioning system) or traffic monitoring systems may be included as a vehicle glazing accessory within the retaining socket.

The invention claimed is:

1. A vehicle glazing comprising at least a first ply of a transparent glazing material and a ply of a plastics material extending across at least a portion of a surface of the ply of transparent glazing material, a first electrical conductor forming an antenna for receiving or transmitting AC signals in the range 100 kHz to 100 GHz provided in contact with the ply of plastics material for supplying an electrical signal to a communication device positioned on the glazing, and a retaining socket, for retaining the communication device and at least one vehicle glazing accessory, mounted on the glazing and having a first electrically conductive coupling portion, wherein the first electrically conductive coupling portion of the retaining socket is aligned with and in direct current electrical isolation from the electrical conductor provided in contact with the ply of plastics material and forms a capacitive connection therewith.

2. The glazing of claim 1, wherein the electrical conductor provided in contact with the ply of plastics material is a printed region of electrically conductive ink.

3. The glazing of claim 1, wherein the electrical conductor provided in contact with the ply of plastics material is an electrically conductive wire embedded in a surface of the ply of plastics material.

4. The glazing of claim 1, wherein the ply of plastics material is an impact resistant polymer film.

5. The glazing of claim 1, wherein the ply of plastics material is a ply of interlayer material, and the glazing further comprises a second ply of a transparent glazing material, the first and second plies of transparent glazing material and the ply of plastics material being laminated together.

6. The glazing of claim 5, wherein the electrically conductive coupling portion of the retaining socket is a metallic plate.

7. The glazing of claim 6, wherein the electrical conductor provided in contact with the ply of plastics material has a length of approximately $\lambda_g/4$, where $\lambda_g$ is the wavelength in the glazing of a signal received or transmitted by the antenna.

8. The glazing of claim 1, wherein the electrically conductive coupling portion of the retaining socket is in the form of a plate extending across at least a portion of the width of the retaining socket.

9. The glazing of claim 1, wherein the electrically conductive coupling portion of the retaining socket is in the form of a wire embedded within the retaining socket.

10. The glazing of claim 1, wherein the retaining socket is formed substantially entirely in electrically conductive material.

11. The glazing of claim 1, wherein the electrically conductive coupling portion of the retaining socket and the electrical conductor provided in contact with the ply of plastics material overlap.

12. The glazing of claims 1, wherein the electrically conductive coupling portion of the retaining socket and the electrical conductor provided in contact with the ply of plastics material are in registration.

13. The glazing of claim 1, wherein the communication device is one of an antenna amplifier, an antenna terminal connection, an antenna stud, a radio connector cable, a transmitter or a receiver.

14. The glazing of claim 1, wherein the vehicle accessory is one of a rear view mirror, a camera, a compass, a sensor, a display device, an automated toll collection transponder, a further antenna, GPS (global positioning system) or traffic monitoring system.

15. The glazing of claim 14, wherein the rear view mirror is an electrochromic rear view mirror.

16. The glazing of claim 1, comprising a second electrical conductor in contact with the ply of plastics material, and the retaining device comprises a second electrically conductive coupling portion, aligned with a second electrical conductor and in direct current electrical isolation therefrom.

17. The glazing of claim 16, wherein the second electrical conductor forms an inductive electrical supply connection for supplying electrical power to the retaining socket.

* * * * *